United States Patent
Jorgensen

(10) Patent No.: US 6,821,499 B2
(45) Date of Patent: Nov. 23, 2004

(54) METHOD OF GENERATING HYDROGEN BY REACTION OF BOROHYDRIDES AND HYDRATES

(75) Inventor: Scott Willis Jorgensen, Bloomfield Township, Oakland County, MI (US)

(73) Assignee: General Motors Corporation, Detroit, MI (US)

( * ) Notice: Subject to any disclaimer, the term of this patent is extended or adjusted under 35 U.S.C. 154(b) by 232 days.

(21) Appl. No.: 10/269,663

(22) Filed: Oct. 11, 2002

(65) Prior Publication Data

US 2004/0071630 A1 Apr. 15, 2004

(51) Int. Cl.$^7$ .............................. C01B 3/02; C01B 6/00
(52) U.S. Cl. ............................... 423/648.1; 423/658.2; 252/118.25; 252/188.26
(58) Field of Search ....................... 252/188.25, 188.26; 423/648.1, 658.2

(56) References Cited

U.S. PATENT DOCUMENTS

| | | | |
|---|---|---|---|
| 3,405,068 A | 10/1968 | Hiltz | 252/182 |
| 4,193,978 A | 3/1980 | Muller et al. | 423/648 |
| 4,302,217 A | 11/1981 | Teitel | 48/180 |
| 5,372,617 A | 12/1994 | Kerrebrock et al. | 48/61 |
| 5,702,491 A | 12/1997 | Long et al. | 48/197 |
| 6,316,133 B1 | 11/2001 | Bossel | 429/17 |

OTHER PUBLICATIONS

Society of Automotive Engineers Paper No. 2000–01–1541, "Suv Powered By On–Board Generated $H_2$" by Steven C. Amendola et al.

The Clean Fuels Report, Nov. 1999, pp. 72–74. "Sodium Borohydride Process Generates Hydrogen", Millennium Cell LLC.

International Journal of Hydrogen Energy 25 (2000) pp. 969–975, "A Safe, Portable, hydrogen Gas Generator Using Aqueous Borohydride Solution and Ru Catalyst", by Steven C. Amendola et al.

*Primary Examiner*—Ngoc-Yen Nguyen
*Assistant Examiner*—Maribel Medina
(74) *Attorney, Agent, or Firm*—Kathryn A. Marra

(57) ABSTRACT

A method is provided in which stoichiometrically proportions of solid alkali metal borohydride are reacted with solid hydrated alkali metal borate. Upon heating, the borohydride hydrolyzes to generate controlled amounts of hydrogen gas and solid by-products. Water for the reaction is stored and carried in the hydrated borate, which is a hydrate of the reaction's by-product. At a suitable temperature, the hydrate melts and releases sufficient water for hydrolysis of the borohydride to molecular hydrogen.

18 Claims, No Drawings

METHOD OF GENERATING HYDROGEN BY REACTION OF BOROHYDRIDES AND HYDRATES

TECHNICAL FIELD

This invention relates generally to hydrogen generation systems. More specifically, this invention relates to generating hydrogen by reaction of an alkali metal borohydride with water obtained from a hydrated alkali metal borate.

BACKGROUND OF THE INVENTION

Hydrogen has been suggested as a beneficial alternative to hydrocarbon fuels. Hydrogen reacts with oxygen to generate more power per gram of fuel than is obtained from the burning of hydrocarbons. And the burning of hydrogen emits less, or even no, exhaust pollution into the atmosphere. Thus, it has been proposed to use hydrogen as a fuel by storing it in a suitable form for combustion with oxygen or for electrochemical reaction with oxygen in a fuel cell. One proposal for the storage of hydrogen is in the form of various metal hydrides or metal borohydrides which can be reacted with water, i.e., the hydrides are hydrolyzed, to release or produce molecular hydrogen.

Alkali metal borohydrides are particularly desirable because they can store a higher proportion of releasable molecular hydrogen. In the presence of a sufficient amount of water and at a suitable temperature, hydrogen is almost completely, if not entirely, released from the borohydride material.

A problem with using metal hydrides or borohydrides as a hydrogen fuel source, however, is that suitable provision must be made for storage of water. In the case of stationary applications at controlled temperatures, the borohydride and water can be easily maintained in separate containers until hydrogen is required by a power source. Upon such demand the water and hydride can be withdrawn from storage and combined in measured, chemically equivalent proportions to produce a specified amount of hydrogen for immediate needs. In the case where hydrogen is used a fuel in a mobile application, such as an automobile fuel cell, the problem of accommodating the solid hydride and liquid water is more challenging. Here space and variable ambient temperature are considerations. In automotive applications it has been proposed both to store the water separate from the borohydride and to use a stabilized solution of the borohydride and water. With either approach, the accommodation of liquid water in borohydride based hydrogen generation systems has presented design problems.

Thus, it is an object of the present invention to provide a method of generating hydrogen that uses suitable alkali metal borohydrides and water that is initially in the form of a solid hydrate material. It is a further object of this invention to provide a mixture of such borohydrides and hydrates that can be stored as non-reacting solids over a range of ambient temperatures and then, upon a demand for hydrogen, induced to react to form a specified amount of molecular hydrogen.

SUMMARY OF THE INVENTION

The present invention provides a method of generating hydrogen by reacting lithium and/or sodium borohydride with water that is initially in the form of solid hydrated lithium and/or sodium borate. In a preferred embodiment of the invention all of the water used in the reaction comes from the initially solid hydrate material. The hydrogen generating reaction occurs by hydrolysis between stoichiometric proportions of borohydride particles and water released from the hydrate to generate optimal yields of hydrogen gas. The hydrogen comes from both the hydride and the water.

Thus, water for hydrogen generation is stored in a hydrated form of lithium and/or sodium borate. The hydrated alkali metal borate contains the water in a material that is solid over a range of ambient temperatures useful for storage as part of a hydrogen generation system. The alkali metal borate is chosen as the water carrier because the alkali metal borohydride is converted to the same borate during the hydrolysis reaction. At the completion of the hydrolysis reaction, the combined borate products can be easily reprocessed to borohydrides or to re-hydrated borates upon recovery from a spent (hydrogen depleted) generation system.

Like other hydrates, the lithium and sodium borate molecules can contain varying numbers of water molecules. The number of water molecules can depend upon the temperature of the hydrate and the ambient humidity. For example, $LiBO_2$ can be formed to contain eight water molecules of crystallization. The octahydrate, $LiBO_2 \cdot 8H_2O$, is stable up to about 45° C. However, upon heating or exposure to a very dry atmosphere hydrated borate molecules can release water molecules stepwise and the borate, if still in hydrated form, may contain as little as two water molecules of crystallization. For most efficient and compact practice of the invention, it is preferred that the hydrate should carry as many water molecules as possible per molecule of borate.

In a preferred embodiment of the invention, the lithium and/or sodium borohydride and corresponding hydrated lithium and/or sodium borate are introduced as a mixture of fine particles into a suitable reaction zone. The mixture is initially heated for controlled release of water from the hydrated borate. It is preferred that the water be released so that it reacts with the borohydride particles rather than evaporating or otherwise escaping the reactor system. Hydrogen is generated as the composition is heated to at least 85° C. At this point, water is released from the hydrate material and spontaneously reacts with the borohydride. The reaction should reach and be maintained at approximately 100° C., and preferably below 120° C., a temperature to which almost all of the hydrogen will be released from the borohydride. Once the reactor is operating, heat released by the hydrolysis reaction will keep the reactor at operating temperature, and no further heating will be needed. The reactor temperature will preferably be maintained at an optimal temperature for the application's requirements. The hydrogen that has been generated can be used to power a hydrogen consuming device used in portable hydrogen generation systems.

The borohydride is converted to lithium or sodium borate in the reaction. The borate may form on the surface of unreacted borohydride particles. Accordingly, it is preferred to stir and even grind the reacting material to assure contact between the water released from the borate and the surfaces of the hydride particles.

The hydrogen that is produced can be directly used to power a hydrogen consuming device, such as an engine or fuel cell, or can be stored for later use. Furthermore, hydrogen can be produced upon demand by reacting controlled amounts of hydride and hydrate in a reaction zone. The system is also cost effective, efficient and highly desirable for easy use and maintenance.

These and other objects and advantages of this invention will become apparent from a detailed description of the invention that follows.

DESCRIPTION OF THE INVENTION

The present invention provides a method of generating hydrogen gas by hydrolysis of lithium and/or sodium borohydride with water obtained from a hydrated lithium and/or sodium borate. A mixture of the borohydride and the hydrated borate is prepared in a suitable form for chemical reaction to occur between them when hydrogen is required. One suitable form is a mixture of fine particles of the two materials. However, prior to initiating the hydrolysis reaction, the reactants are preferably stored separately under temperature and pressure conditions at which water is not lost from the hydrated borate, especially if the water content of the hydrate is high. If a lower water content hydrate is used, the materials may be premixed for storage.

When hydrogen is required the mixture is heated to release water molecules from the hydrate and promote its reaction with the borohydride. Preferably, the borohydride and hydrated borate are mixed in proportions so that the hydrated borate provides enough water to fully hydrolyze the borohydride. The hydrolysis of lithium borohydride is generally shown in the following equation:

$$LiBH_4 + (2/x)[LiBO_2 \cdot xH_2O] \rightarrow 4H_2 + (1+(2/x)) LiBO_2$$

In the case of lithium or sodium borohydride, x is an integer usually having a value from 2 to 8. Thus, the amount of lithium or sodium borohydride to be mixed with a specified hydrated lithium borate, or sodium borate, depends on x, the water content of the hydrate. In order to minimize the initial borate content of the reacting system it is preferred that the value of x, i.e., the number of water molecules of crystallization be as large as can be maintained in the hydrate under the anticipated storage conditions.

Solid lithium and/or sodium borohydride is commercially available in several forms, i.e., as a powder, as pellets, or as a single coherent body like a capsule. The borohydride is fairly stable and conveniently stored in sealed vessels at ambient temperatures and atmospheric pressures.

For the present invention, several molecules of water can be stored per molecule of lithium or sodium borate in the form of a hydrate under suitable ambient conditions. Furthermore, the anhydrous form of the borate is substantially the chemical equivalent of the byproduct of the hydrolysis of the borohydride. Thus, hydrated lithium and/or sodium borate, are preferred for use in the present invention. The hydrated borate operates merely to stabilize an appreciable number of water molecules in solid form and merge with the by-product of the hydrolysis reaction. Hydrated lithium and/or sodium borate can be produced, for example, by careful evaporation and drying of aqueous solutions of their borate salts.

An optimal amount of hydrogen gas can be generated by hydrolyzing the borohydride with hydrated lithium borate having 8 water molecules. This reaction is shown in the following equation:

$$4LiBH_4 + LiBO_2 \cdot 8H_2O \rightarrow 16H_2 + 5LiBO_2$$

When hydrogen gas is desired, a stoichiometric proportion of borohydride and hydrate are placed in, or delivered to, a reaction zone comprising one or more reactor stages. In order to obtain optimal yields of hydrogen gas, the borohydride and the hydrate are preferably ground into fine particle sizes. The generation of hydrogen proceeds by mixing the components in a reaction volume and heating the mixture to release water from its borate carrier and induce hydrolysis of the borohydride.

If the generated hydrogen is to be used in a mobile operating system, such as in a motorized vehicle, a stirred, flow-through reactor may be preferred. The stirred flow through reactor permits metered amounts of reactants to be withdrawn from storage and progressively heated and ground to carry hydrogen and by-product borates from the reactor space. At suitable reaction temperatures, hydrogen is produced and increases the pressure in the reactor space. The higher pressure forces the hydrogen, as well as the reaction's by-products, out of the reactor space. Hydrogen is separated from the solid byproducts and delivered to, for example, an engine or fuel cell.

Thus the subject borohydride/hydrated borate mixture and hydrogen generation method can be used to generate hydrogen on demand as it is needed to power an engine, fuel cell or the like. Generally, a 2:1 mole ratio of water molecules to borohydride molecules is required in order to produce optimal amounts of hydrogen gas; ratios either higher or lower than this value will lower the yield of hydrogen output. Operation according to the first equation above maintains this optimum ratio regardless of the water content of the hydrate.

One of the benefits of the present invention is the ability to store water as a hydrate at sub-freezing ambient temperatures and still be able to produce demanded quantities of hydrogen gas. At temperatures below 45° C., both the borohydride and the hydrate are in solid form. Consequently, the hydrate is always manipulated as a solid.

Although a tiny fraction of the stored hydrogen will be released as the two solids come into contact, an increase in temperature will cause the hydrate will melt and release water. A spontaneous reaction then takes place at temperatures of at least 85° C. and release of almost all of the hydrogen will occur at temperatures of approximately 100° C. At this point, the hydrolysis reaction is self-sustaining and exothermic. Preferably, the reaction zone temperature should be kept slightly below 120° C. This will help minimize water loss and improve hydrogen yield.

The solid byproduct of the hydrogen producing reaction is lithium and/or sodium borate. This byproduct can be hydrogenated to regenerate the borohydride starting material. A portion of the borate can be hydrated to reconstitute the water storage medium of this invention.

As described, it is generally preferred to store the reactants separately as fine particles. However, other forms can be adapted for storage. The reactants can be stored in tubes or capsules for feeding into a reaction zone. The reactants could be embedded in an inert binding material for delivery to the reaction space.

While the invention has been described in terms of a preferred embodiment, it is not intended to be limited to that description, but rather only to the extent of the following claims.

What is claimed is:

1. A method of generating hydrogen comprising reacting alkali metal borohydride with hydrated alkali metal borate, said borate having sufficient water for the substantially complete hydrolysis of said borohydride to molecular hydrogen, said alkali metal in each instance being selected from the group consisting of lithium and sodium.

2. A hydrogen generation method as recited in claim 1 where said hydrated borate comprises at least two molecules of water per molecule of borate.

3. A hydrogen generation method as recited in claim 1 comprising reacting lithium borohydride with lithium metaborate octahydrate.

4. A hydrogen generation method as recited in claim 1 comprising reacting sodium borohydride with sodium metaborate octahydrate.

5. A hydrogen generation method as recited in claim 1 comprising reacting said borohydride with said hydrated borate at a temperature of at least 85° C.

6. A hydrogen generation method as recited in claim 3 comprising reacting said borohydride with said hydrated borate at a temperature of at least 85° C.

7. A hydrogen generation method as recited in claim 4 comprising reacting said borohydride with said hydrated borate at a temperature of at least 85° C.

8. A method of generating hydrogen comprising the steps of:
   mixing lithium- and/or sodium borohydride particles with hydrated lithium- and/or sodium borate particles, said borate particles having sufficient water for the substantially complete hydrolysis of said borohydride particles to molecular hydrogen; and
   heating said borohydride and borate mixture to release water from said hydrated borate for reaction with said borohydride to form said molecular hydrogen.

9. A hydrogen generation method as recited in claim 8 where said hydrated borate comprises at least two molecules of water per molecule of borate.

10. A hydrogen generation method as recited in claim 8 comprising reacting lithium borohydride with lithium metaborate octahydrate.

11. A hydrogen generation method as recited in claim 8 comprising reacting sodium borohydride with sodium metaborate octahydrate.

12. A hydrogen generation method as recited in claim 8 comprising heating said borohydride with said hydrated borate at a temperature of at least 85° C.

13. A hydrogen generation method as recited in claim 10 comprising heating said borohydride with said hydrated borate at a temperature of at least 85° C.

14. A hydrogen generation method as recited in claim 11 comprising heating said borohydride with said hydrated borate at a temperature of at least 85° C.

15. A composition for generating hydrogen gas, said composition consisting essentially of lithium- and/or sodium borohydride particles and hydrated lithium and/or sodium borate particles, said borate comprising sufficient water as said hydrate for the substantially complete hydrolysis of said borohydride to molecular hydrogen.

16. A composition as recited in claim 15 where said hydrated borate comprises at least two molecules of water per molecule of borate.

17. A composition as recited in claim 15 consisting essentially of lithium borohydride and lithium borate octahydrate.

18. A composition as recited in claim 15 consisting essentially of sodium borohydride and sodium borate octahydrate.

* * * * *